(12) United States Patent
Hotes et al.

(10) Patent No.: US 10,094,134 B2
(45) Date of Patent: *Oct. 9, 2018

(54) MULTI-LAYER SHELTER INSULATION SYSTEM

(71) Applicant: Alaska Structures, Inc., Kirkland, WA (US)

(72) Inventors: Richard W. Hotes, Anchorage, AK (US); Michael Vesper, Adamstown, MD (US)

(73) Assignee: Alaska Structures, Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,403

(22) Filed: Sep. 20, 2016

(65) Prior Publication Data

US 2017/0009478 A1   Jan. 12, 2017

Related U.S. Application Data

(63) Continuation of application No. 14/641,703, filed on Mar. 9, 2015, now abandoned, which is a
(Continued)

(51) Int. Cl.
*E04H 9/16* (2006.01)
*E04H 15/54* (2006.01)
(Continued)

(52) U.S. Cl.
CPC ............... *E04H 9/16* (2013.01); *E04B 1/74* (2013.01); *E04H 15/12* (2013.01); *E04H 15/14* (2013.01); *E04H 15/18* (2013.01); *E04H 15/322* (2013.01); *E04H 15/34* (2013.01); *E04H 15/36* (2013.01); *E04H 15/54* (2013.01); *E04H 15/64* (2013.01);
(Continued)

(58) Field of Classification Search
CPC ......... E04H 15/54; E04H 15/36; E04H 15/10; E04H 2015/207; E04H 9/14; E04H 15/34; E04H 15/322; E04H 15/12; E04H 15/14; E04H 9/16; E04B 1/74; E04B 1/62; E04B 1/762; Y10S 135/905
USPC .............. 135/87, 91–94, 115, 119, 124, 137, 135/905–906; 52/63, 86, 169.11, 745.15, 52/471.3, 783.1
See application file for complete search history.

(56) References Cited

U.S. PATENT DOCUMENTS 2,948,362 A * 8/1960 Jones ................. E04B 1/24
138/111
3,233,617 A * 2/1966 Stern ................. E04B 1/34326
135/138
(Continued)

FOREIGN PATENT DOCUMENTS

DE    1 991 743    8/1968

*Primary Examiner* — Winnie Yip
(74) *Attorney, Agent, or Firm* — Blank Rome LLP

(57) ABSTRACT

A portable, insulated shelter consists of flexible inner and outer layers, lightweight fabric panels located therebetween, and connected to each other, a suitable support frame, and a system, such as a HVAC unit and a suitable connector, for actively controlling the interior environment of the shelter. The shelter may be used to protect and provide livable conditions in harsh, remote locations. Methods of selectively installing and removing the fabric panels are also provided, along with methods of setting up and disassembling the shelter.

11 Claims, 4 Drawing Sheets

Related U.S. Application Data continuation of application No. 13/283,772, filed on Oct. 28, 2011, now Pat. No. 8,997,767.

(51) Int. Cl.

| | |
|---|---|
| *E04B 1/74* | (2006.01) |
| *E04H 15/12* | (2006.01) |
| *E04H 15/14* | (2006.01) |
| *E04H 15/34* | (2006.01) |
| *E04H 15/36* | (2006.01) |
| *E04H 15/64* | (2006.01) |
| *E04H 15/18* | (2006.01) |
| *E04H 15/32* | (2006.01) |
| *E04H 15/20* | (2006.01) |

(52) U.S. Cl.
CPC ..... *E04H 2015/207* (2013.01); *Y10S 135/905* (2013.01)

(56) References Cited

U.S. PATENT DOCUMENTS

| | | | |
|---|---|---|---|
| 3,909,992 A | 10/1975 | Stachiw | |
| 4,000,749 A | 1/1977 | Busco | |
| 4,024,679 A | 5/1977 | Rain et al. | |
| 4,194,328 A | 3/1980 | Peirson et al. | |
| 4,279,112 A | 7/1981 | Bertrand | |
| 4,308,882 A | 1/1982 | Pusch et al. | |
| 4,649,947 A | 3/1987 | Tury et al. | |
| 4,705,717 A | 11/1987 | Cain et al. | |
| 4,706,420 A | 11/1987 | Winkler | |
| 4,869,037 A * | 9/1989 | Murphy | E04B 1/642 52/238.1 |
| 4,878,322 A * | 11/1989 | Ikeda | A01G 9/1415 52/2.18 |
| 5,245,802 A | 9/1993 | Davis | |
| 5,335,684 A | 8/1994 | Hanninen | |
| 6,599,850 B1 * | 7/2003 | Heifetz | B32B 15/14 428/91 |
| 6,679,009 B2 | 1/2004 | Hotes | |
| 7,735,502 B1 | 6/2010 | Hotes | |
| 7,882,849 B2 * | 2/2011 | Franta | E04H 15/001 135/115 |
| 8,082,700 B2 * | 12/2011 | Kennedy | E04B 1/3205 135/124 |
| 8,534,305 B1 * | 9/2013 | Woodall | E04H 15/12 135/115 |
| 9,371,665 B2 * | 6/2016 | Herpin | E04H 15/40 |
| 2007/0023076 A1 | 2/2007 | Eide et al. | |
| 2008/0289674 A1 | 11/2008 | Franta | |
| 2009/0071080 A1 | 3/2009 | Bourgain et al. | |

* cited by examiner

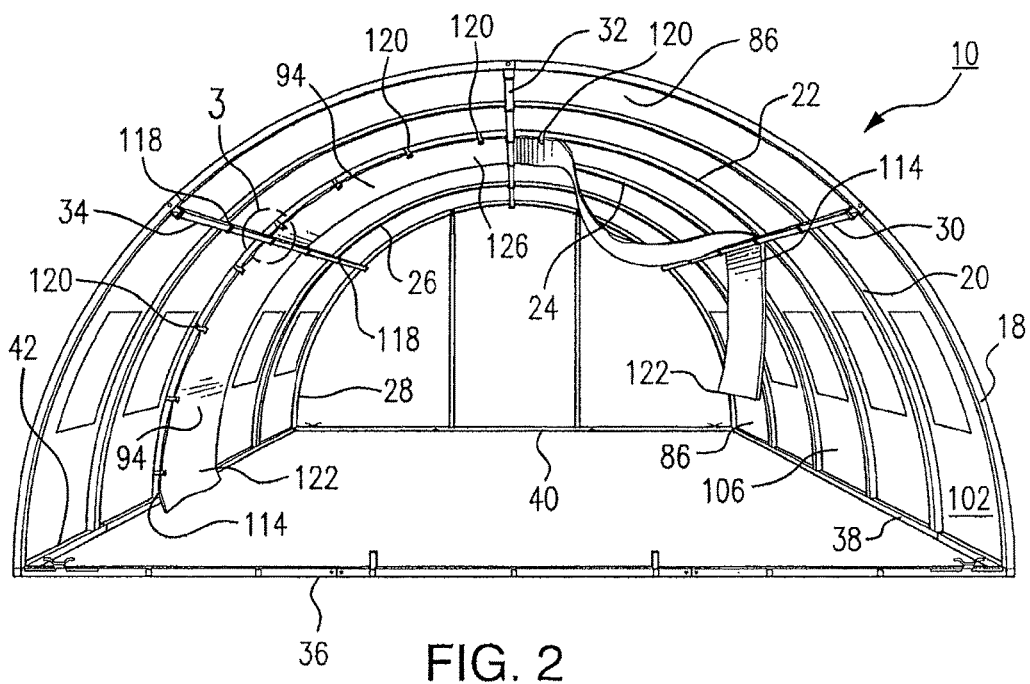
FIG. 2
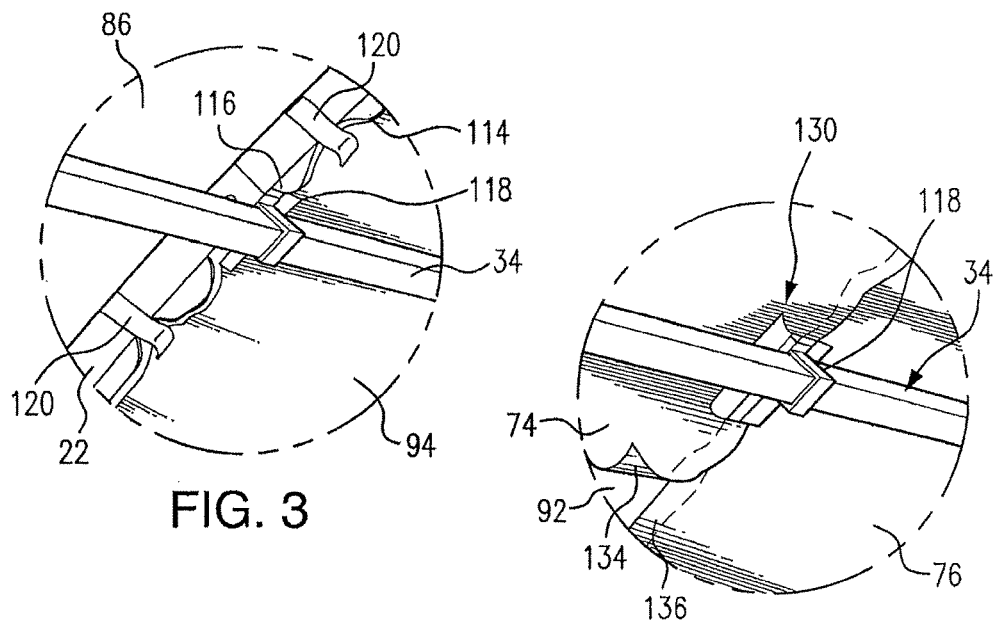
FIG. 3
FIG. 6

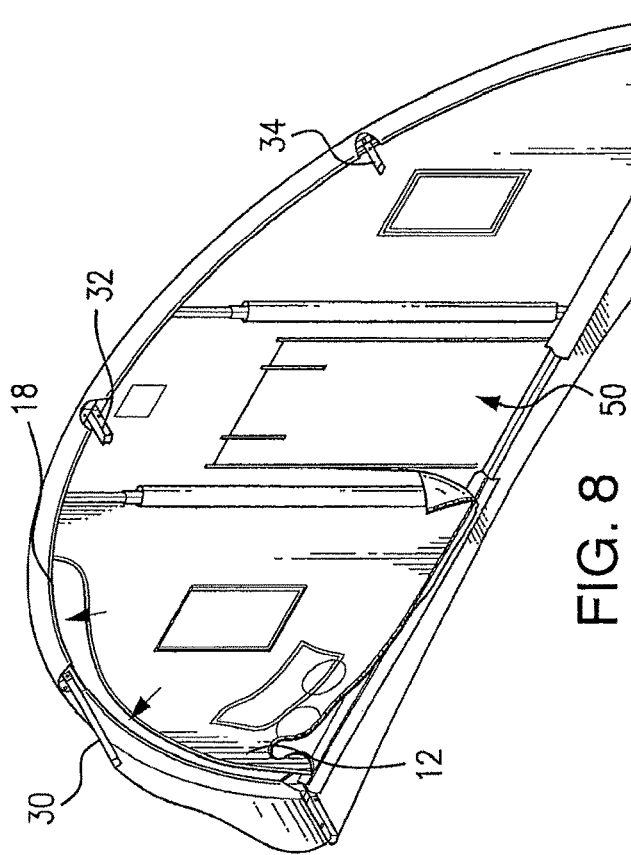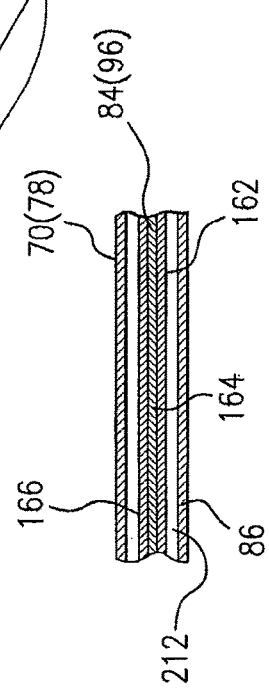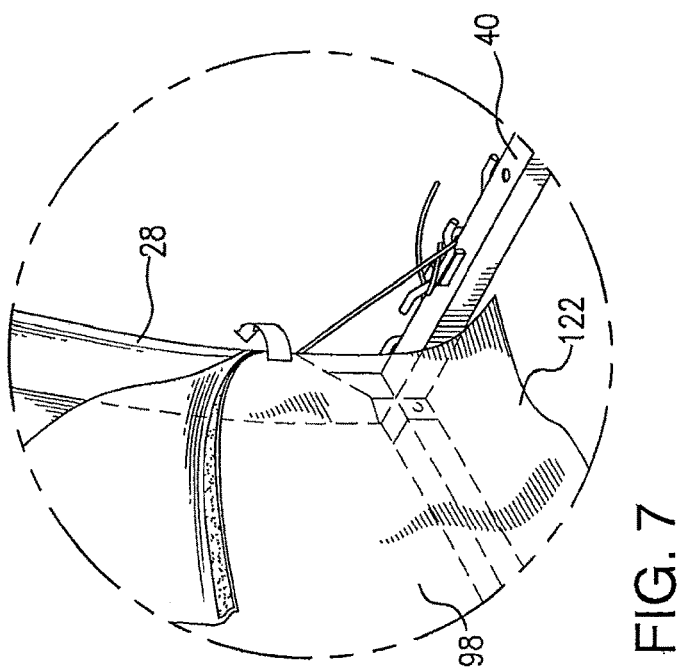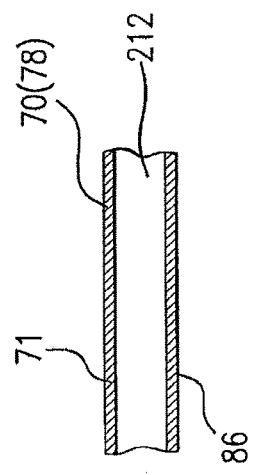
FIG. 8
FIG. 9B
FIG. 7
FIG. 9A

MULTI-LAYER SHELTER INSULATION SYSTEM

This application is a continuation of U.S. patent application Ser. No. 14/641,703, filed Mar. 9, 2015, which is a continuation of U.S. patent application Ser. No. 13/283,772, filed Oct. 28, 2011, now U.S. Pat. No. 8,997,767. The entire disclosure of U.S. patent application Ser. Nos. 14,641,703 and 13/283,772 are incorporated herein by reference.

BACKGROUND

Although a number of shelters, tents and insulation systems are known or have been suggested in the art, they all have or would have disadvantages. Japanese Patent No. 2004-132006 (Kawahara), for example, discloses a heat-insulating layer for a tent. An air layer D is formed between the tent 3 and a canopy sheet 5. As shown in FIG. 4 of Kawahara, cylindrical members 4 are attached to the exterior cover 5 by staple-shaped elements 8. The Kawahara tent requires a device f for forcing air through a duct d, which would waste energy, and the Kawahara tent is unduly complicated and unreliable, and it would be difficult to transport and set up, especially in remote, harsh environments.

U.S. Patent Application Publication No. 2009/0188539 (Hollinger) refers to the use of inert gas or low pressure within hollow or airtight tubes 901, 911 (FIGS. 9A, 9B) to provide insulation within a multi-layer tent. The Hollinger tent would require a source of inert gas, which would be impracticable, or inflation/deflation of the tubes, and the tubes would be subject to puncturing and damage, or additional construction expense would be required to make them sufficiently rugged. The Hollinger tent is unduly complicated and unreliable, and would be difficult to transport and set up, especially in remote, harsh environments.

Japanese Patent No. 2006-265849 to Shimizu discloses a fabric shelter (FIG. 14), and other shelters known in the art are shown in U.S. Pat. No. 4,102,352 (Kirkham), U.S. Pat. No. 4,607,655 (Wagner et al.), and U.S. Pat. No. 7,178,483 (Wu).

SUMMARY

The disadvantages of the prior art can be overcome to a great extent by a portable, insulated shelter that has flexible inner and outer layers, and lightweight fabric insulation panels located between the inner and outer layers. The shelter may be used, for example, to shelter human occupants in harsh, remote environments. In a preferred embodiment, the inner layer provides the inner surfaces of the shelter, and provides a living space by surrounding the occupants above and on all sides thereof.

The fabric panels may be connected together to provide thermal insulation for the shelter, by surrounding the flexible inner layer above and on all sides thereof. The outer layer may be used to protect the fabric panels (or the inner layer/liner when the fabric panels are not installed) from wind, rain, ice and snow. The flexible outer layer is preferably located outside of the fabric panels, and the shelter has only three layers, such that the fabric panels are sandwiched between the inner layer and the outer layer.

In a preferred embodiment of the invention, the fabric panels each include multiple layers of materials sandwiched together, and the fabric panels are removably connected to each other, and to the frame, by hook and loop fasteners.

In a preferred embodiment of the invention, the shelter may be supported by an exterior frame, made up, for example, of aluminum poles that can be disassembled. The invention is not limited, however to the preferred embodiments. The shelter may be supported by an interior frame made of arches and purlins, in a Quonset but configuration, and/or by other suitable support structures.

In a preferred embodiment of the invention, an HVAC unit is used to provide heat and/or cooling for the shelter occupants. The unit may be powered by liquid hydrocarbon fuel, or other suitable power sources. In a preferred embodiment, the shelter may be designed to maintain an interior temperature of about seventy degrees Fahrenheit, for outside ambient temperatures in the range of from about minus twenty-five degrees to plus one hundred and twenty-five degrees Fahrenheit, with significant reduction in energy power requirements compared to conventional shelters.

The disadvantages of the prior art may also be overcome to a great extent by using a portable, insulated shelter to protect human occupants in a harsh, remote environment, where the shelter has a liner and an outer layer, and a fabric insulation layer located between the flexible inner and outer layers. According to this aspect of the invention, the flexible inner layer provides the inner surfaces of the shelter, surrounding the occupants above and on all sides thereof, and the fabric insulation panels are installed and/or removed after the inner and outer layers are shelter are provided.

When the fabric panels are installed, they are sandwiched between the inner and outer layers, and thereby provide thermal insulation for the shelter. In a preferred, especially compact and convenient embodiment of the invention, the top and side walls of the shelter do not have any layers other than the inner and outer layers and the fabric insulation panels.

In a preferred embodiment of the invention, the shelter is convenient and easy to set up. Although a six-foot ladder may be used during assembly, the shelter otherwise can be installed without any special tools.

According to one aspect of the invention, when insulation is desired, the fabric panels are located between the inner and outer layers of the shelter, such that the inner layer of the shelter is provided by the same element in both insulated and non-insulated configurations. The shelter can be changed from a non-insulated to an insulated configuration without changing the interior space of the shelter. In other words, since there is an inner wall located inside the insulation, the shelter has a comfortable, finished configuration, even when the insulation panels are installed, and the inner layer is always located inside the frame elements, even when the insulation panels are not installed. Thus, the insulation system described herein is particularly well suited for providing livable interior conditions in harsh climates, using portable fabric shelters, tents and other soft-walled structures.

BRIEF DESCRIPTION OF DRAWINGS

FIG. 2 is another perspective view of the shelter of FIGS. 1A and 1B, looking into the shelter from the front to the back, with the front of the shelter removed, and with the liner removed.

FIG. 3 is an enlarged view of portion 3 of FIG. 2, showing a purlin-arch connection.

FIG. 6 is an enlarged view of portion 3 of FIG. 2, showing two liner sections surrounding the purlin-arch connection.

FIG. 7 is an enlarged view of a portion of the shelter of FIG. 1B, showing a hook and loop connection between a fifth insulation panel and a sixth arch.

FIG. 8 is a perspective view of a front portion of the shelter of FIG. 1B, viewed from inside the shelter.

FIG. 9A is a cross-sectional view taken along line 9A of FIG. 1A, showing the liner and the outer cover.

FIG. 9B is a cross-sectional view taken along line 9B of FIG. 1B, showing the liner, the insulation layer, and the cover.

DETAILED DESCRIPTION

Figure 1A:
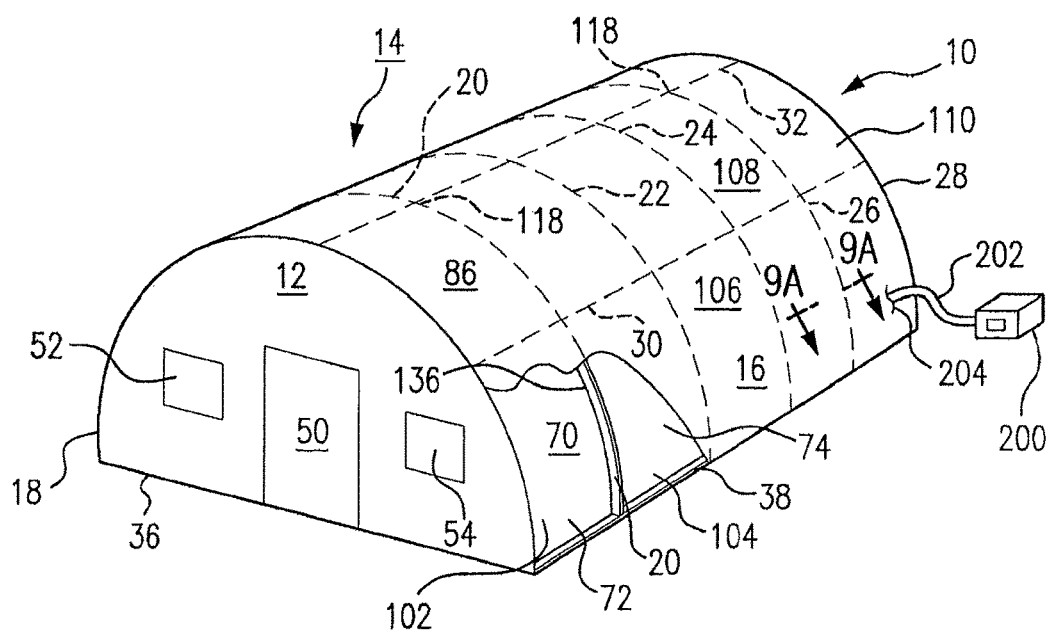
FIG. 1A is a perspective view of a shelter constructed in accordance with a preferred embodiment of the present invention, in a non-insulated configuration.

Turning now to the drawings, where like reference numerals designate like elements, there is shown in FIG. 1A an exemplary shelter 10 constructed in accordance with a preferred embodiment of the present invention. The shelter 10 has a front wall 12, a back wall (not shown), a roof 14, and side walls 16. The right side wall (not shown) is the mirror image of the left side wall 16. The front and back walls 12, the roof 14, and the side walls 16 are supported by a suitable frame made of aluminum, wood or the like, which has, by way of example, six arches 18, 20, 22, 24, 26, 28, three longitudinally-extending purlins 30, 32, 34 (FIG. 2), and suitable floor-frame members 36, 38, 40, 42. Depending on expected wind and other conditions, the shelter 10 may be tied to the ground by suitable wires or ropes (not shown). The shelter 10 may have, for example, a Quonset but configuration, and may be, for example, about twenty feet wide and about thirty two and one-half feet long.

The front and back walls 12 of the shelter 10 may have a semi-circular configuration, and are secured to the frame 18, 28, 36, 40 along their peripheries (that is, along the edges of the front and back walls 12). If desired, a door 50 (FIGS. 1A, 1B) and windows 52, 54 may be located in the front wall 12. The roof and side walls 14, 16 may be formed of one or more rectangular, flexible pieces that extend flexibly from the ground on the right side of the shelter 10, over the top of the shelter 10, and to the ground on the left side of the shelter 10. The front and back walls 12, the roof 14, and the side walls 16 are secured together along their peripheries (that is, seamed along all of their adjoining edges) to form a secure, weather-proof enclosure, such that the shelter 10 provides a comfortable interior space for the occupants (not shown), with interior surfaces (not shown in FIG. 1) that do not need to be changed or covered even when the shelter 10 is collapsed and taken down for transport to another location.

In a non-insulated configuration, the front and back walls 12, and the roof and side walls 14, 16, across essentially their entire extents, have the two-layer configuration illustrated in FIGS. 1A and 9A. There is an inner fabric liner 70 with an inner surface 71 that faces inwardly toward the occupants (or storage space) inside the shelter 10. The liner 70 is formed of five rectangular panels 72, 74, 76, 78, 80 that together are essentially coextensive with the roof and the sidewalls 14, 16. As such, the liner 70 covers essentially the entire living space (and/or storage space) provided by the shelter 10. The liner 70 may be supported by the purlins 30, 32, 34, as discussed in more detail below.

Figure 1B:
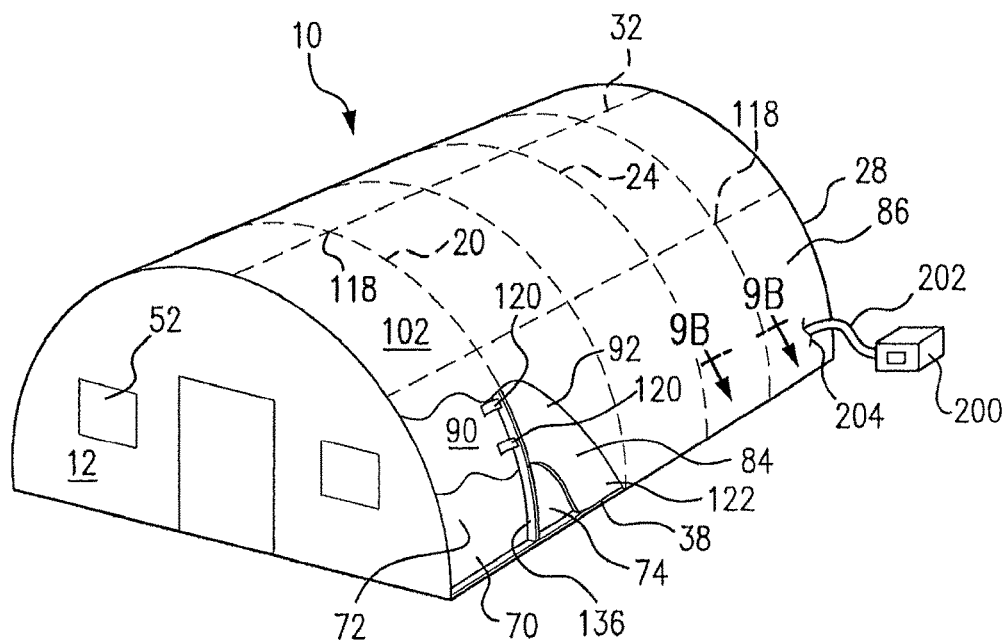
FIG. 1B is a perspective view of the shelter of FIG. 1A, in an insulated configuration, with insulation panels located between an outer cover and an inner liner.

As shown in FIGS. 1B and 9B, an insulation layer 84 may be installed (and, if desired, removed from) between the liner 70 and the outer layer 86 of the shelter 10. The insulation layer 84, in the illustrated embodiment, is made up of five rectangular insulation panels 90, 92, 94, 96, 98, only two of which can be seen in FIG. 1B, and only one of which (94) is shown, partially installed, in FIG. 2. To install the insulation layer 84, that is, to change the shelter configuration from that of FIG. 1A (9A) to that of FIG. 1B (9B), the inner layer 70 (all five liner panels 72, 74, 76, 78, 80) is completely removed, such that the inside of the shelter 10 is as shown in FIG. 2. Then, a central insulation panel 94 is threaded between the outer layer 86 and the purlins 30, 32, 34. In operation, the central insulation panel 94 is laid out on the floor of the shelter 10 and aligned with the center bay 106. Then the panel 94 is lifted up and placed in position, by running the panel 94 over the three purlins 30, 32, 34 in the center bay 106. In the installed configuration (FIG. 1B), the center insulation panel 94 is sandwiched between the purlins 30, 32, 34 and the outer cover 86 of the shelter 10.

As shown in FIG. 3, the front edge 114 of the center insulation panel 94 overlaps the third arch 22, except where purlin cutouts 116 are provided to make room for purlin-arch connections 118. The front edge 114 has one cutout 116 for each of three purlin-arch connections 118, since there are three purlins 30, 32, 34 in the illustrated shelter 10. The front edge 114 of the center insulation panel 94 also has hook and loop tabs 120 that wrap around the third arch 22 to secure the panel 94 in the insulated configuration. The insulation panel 94 may be located so that any side windows (not shown) open down and toward the inside of the shelter 10. The length of the insulation panel 94 is slightly longer than the length of the arches 22, 24, such that the ends 122 (FIG. 2) of the panel 94 overlap the floor frame 38, 42.

Figure 4:
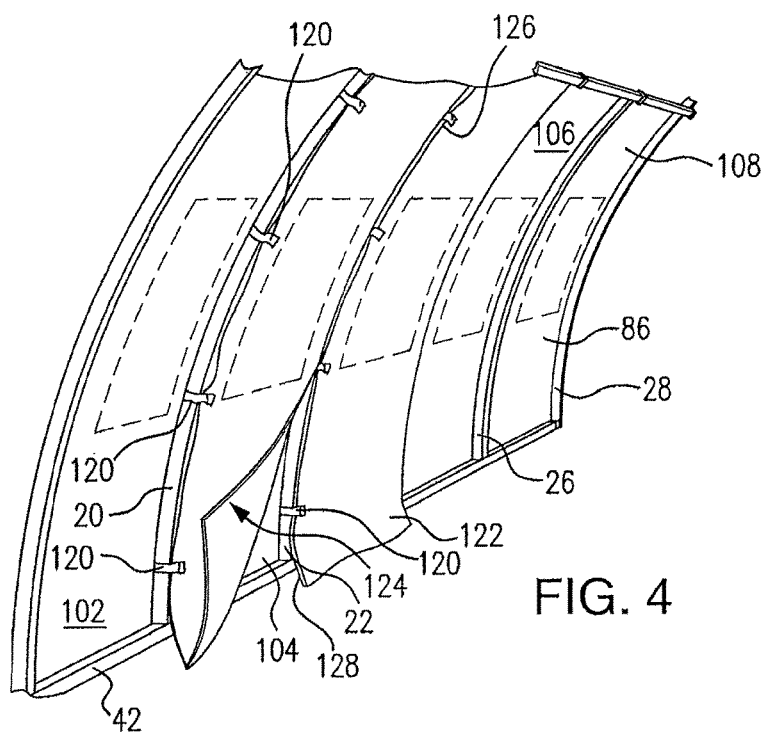
FIG. 4 is a perspective view of a portion of the shelter of FIGS. 1A and 1B, viewed from inside the shelter, with the liner removed, and with two insulation panels connected to respective arches.

The other four insulation panels 90, 92, 96, 98 are essentially identical to the center panel 94, and they are threaded, one at a time, between the cover 86 and the purlins 30, 32, 34, and their front edges are connected to the respective first, second, fourth and fifth arches 18, 20, 24, 26 by the same arrangement of hook and loop tabs 120 and purlin cutouts 116. Hook and loop inner seams 124 (FIG. 4) that run essentially the entire lengths of the back edges 126 of the first four insulation panels 90, 92, 94, 96 are then connected to corresponding hook and loop outer seams 128 that run along essentially the entire lengths of the front edges of the second through fifth insulation panels 92, 94, 96, 98. Each pair of seams 124, 128 is interrupted in three places by the purlin cutouts 116, to accommodate the purlin-arch connections. The overlapped seams 124, 128 provide a sealed thermal barrier between the outside and the inside surfaces of the insulation layer 84. In the insulated configuration, the arches 20, 22, 24, 26 are located mostly outside of the insulation layer 84. That is, the arches 20, 22, 24, 26 are located between (1) the flexible seams 124, 128 of the insulation layer 84 and (2) the flexible outer cover 86.

Figure 5:
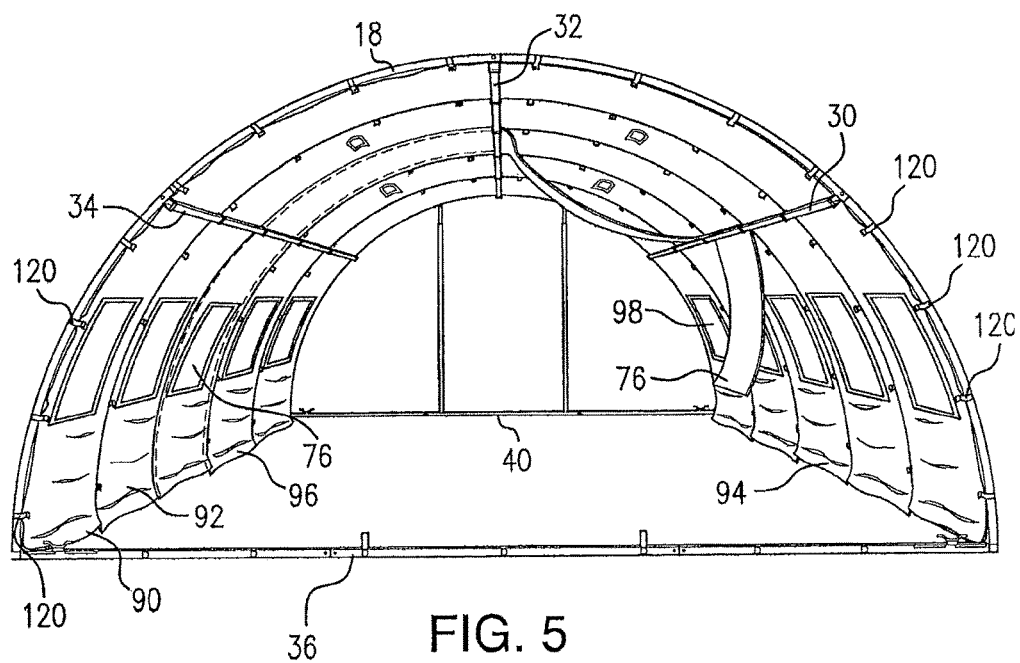
FIG. 5 is a front perspective view, like FIG. 2, with all of the insulation panels installed, and with one of the liner sections partially re-installed.

Then, after the five insulation panels 90, 92, 94, 96, 98 are installed, connected to the respective arches, and seamed together, the liner panels 72, 74, 76, 78, 80 are returned to their original positions. FIG. 5 shows the center liner panel 76 being returned to its original position in the center bay 106. The liner panels 72, 74, 76, 78, 80 are seamed together by, for example, hook and loop seams along their edges 134, 136 (FIG. 6), with suitable purlin cutouts 130 being provided to accommodate the purlin-arch connections 118.

Liners for the front 12 and back of the shelter 10 may also be removed to permit installation of insulation. The front and back insulation layers and liners may be connected to the outer cover 86 and the first and sixth arches 18, 28 and the front and back floor-frame members 36, 40 by suitable zippers or hook and loop seams. Liners for the front and back of the shelter 10 may be installed as shown in FIG. 8. When the door 50 is made of a flexible material, the liner 70 may be connected to the door 50 by a zipper. When the door is solid (not flexible), the liner 70 may be connected to the door by a suitable adhesive (not illustrated).

The outer layer 86, which may be made of polyvinyl chloride (PVC), is essentially coextensive with the inner layer 70 (and therefore essentially coextensive with the front and back walls 12, the roof 14 and the side walls 16). The inner layer (liner) 70 may be made of a lightweight polyethylene material. The outer fabric layer 86 completely surrounds the shelter 10 and thereby provides an outer fabric shell which operates as a noise barrier, and which protects all elements inside the outer layer 86, including the frame elements, from wind, rain, snow and the like and which prevents insects and other pests from entering the shelter 10.

Each insulation panel 90, 92, 94, 96, 98 may be made of lightweight, flexible material, and may be constructed of multiple layers 162, 164, 166 sandwiched together, as shown in FIG. 9B.

An HVAC unit 200 (FIGS. 1A, 1B) can be provided to supply heated, cooled, humidified and/or dehumidified air to the interior of the shelter 10 via suitable tubing 202 and sealed openings 204 through the shelter 10. If desired, one of the insulating panels 98 may be provided with a pre-cut hole (not shown) to conveniently accommodate the tubing 202 without providing space for air drafts and/or pests to enter the shelter 10. The HVAC unit 200 may be electric (and connected to a liquid-fueled generator) or may itself be fueled by gasoline, diesel fuel or the like. In a preferred embodiment of the invention, two stovepipe-type openings may be provided.

It can be very expensive to transport liquid fuel to remote locations. Consequently, an important advantage of the present invention is that it can provide an efficient insulating system, forming a three-layer shell around the occupants (or the storage space provided by the shelter 10), that reduces overall fuel consumption and that is also lightweight, and convenient to handle and install, and that provides a livable interior space without disrupting the inner surfaces of the interior space when the insulation pieces 90, 92, 94, 96, 98 are removed and installed. The insulation panels can be affixed in the space 212 (FIGS. 9A, 9B) between the inner and outer layers 70, 86 when desired.

The invention is not limited to the structures, methods and instrumentalities described above and shown in the drawings. Among other things, the invention is not limited to the particular Quonset but configuration shown in the drawings, nor is it limited to the particular number or arrangement of illustrated frame elements. The invention may be implemented, for example, in a Gable-type shelter, and in a wide variety of other configurations. The invention is defined by the claims set forth below.

What is claimed and desired to be protected by Letters Patent of the United States is:

1. A portable, insulated shelter for sheltering human occupants in harsh, remote environments, said shelter comprising:
    a flexible liner for providing inner surfaces of the shelter, the flexible liner being arranged to surround the occupants;
    lightweight fabric panels for providing thermal insulation for said shelter, said lightweight fabric panels being connected to each other, and being arranged adjacent to the flexible liner, such that the fabric panels surround the flexible liner; and
    a flexible outer layer for protecting the fabric panels or the liner from wind, rain, ice and snow, said flexible outer layer being located outside of the fabric panels, such that the fabric panels are sandwiched between the liner and the outer layer,
    wherein the fabric panels each include multiple layers of materials sandwiched together,
    wherein the fabric panels are removably connected to each other by hook and loop fasteners,
    wherein the portable, insulated shelter further comprises a frame for supporting said shelter, and
    wherein the portable, insulated shelter has top and side walls, and wherein the top and side walls of the shelter do not have any layers other than the liner, the fabric panels, and the outer layer.

2. The portable, insulated shelter of claim 1, wherein said frame includes multiple, elongated pieces that can be disassembled for storage or transport of said shelter to a second location, and wherein the hook and loop fasteners form seams that are interrupted by purlin cutouts.

3. The portable, insulated shelter of claim 1, further comprising a HVAC unit, located outside the flexible outer layer, for heating and/or cooling the interior of the shelter.

4. The portable, insulated shelter of claim 3, wherein the HVAC unit is powered by liquid fuel.

5. The portable, insulated shelter of claim 4, further comprising tubing for connecting the HVAC unit to the interior of said shelter, through said lightweight fabric panels.

6. A method of using a shelter in a harsh, remote environment, said method comprising the steps of:
    providing a flexible liner for providing inner surfaces of the shelter, such that the flexible liner surrounds occupants above and on all sides thereof;
    providing lightweight fabric insulation panels, and providing a flexible outer layer for protecting the lightweight fabric insulation panels or the liner from wind, rain, ice or snow; and
    subsequently, installing the lightweight fabric insulation panels adjacent to and between said liner and said outer layer, and connecting said fabric panels to each other, such that said fabric panels are sandwiched between said liner and said outer layer, and thereby providing thermal insulation for said shelter,
    wherein the fabric panels are removably connected to each other by hook and loop fasteners, and
    wherein the shelter has top and side walls, and wherein the top and side walls of the shelter do not have any layers other than the liner, the panels, and the outer layer.

7. The method of claim 6, further comprising a step of removing the fabric insulation panels from between the liner and the outer layer.

8. The method of claim 7, wherein the fabric panels each include multiple layers of materials sandwiched together.

9. The method of claim 6, further comprising a step of using a frame to support said shelter, and wherein the fabric panels and the liner are located between purlins and the outer layer, and wherein the step of removably connecting the fabric panels to each other by the hook and loop fasteners includes the step of forming seams that are interrupted by purlin cutouts.

10. The method of claim 9, further comprising a step of disassembling elongated pieces of said frame for storage or transport of said shelter.

11. The method of claim 6, further comprising a step of using a heating/cooling unit to heat and/or cool the interior of said shelter.

* * * * *